METHOD OF GROWING COMPOUND SEMICONDUCTOR FILMS ON AN AMORPHOUS SUBSTRATE

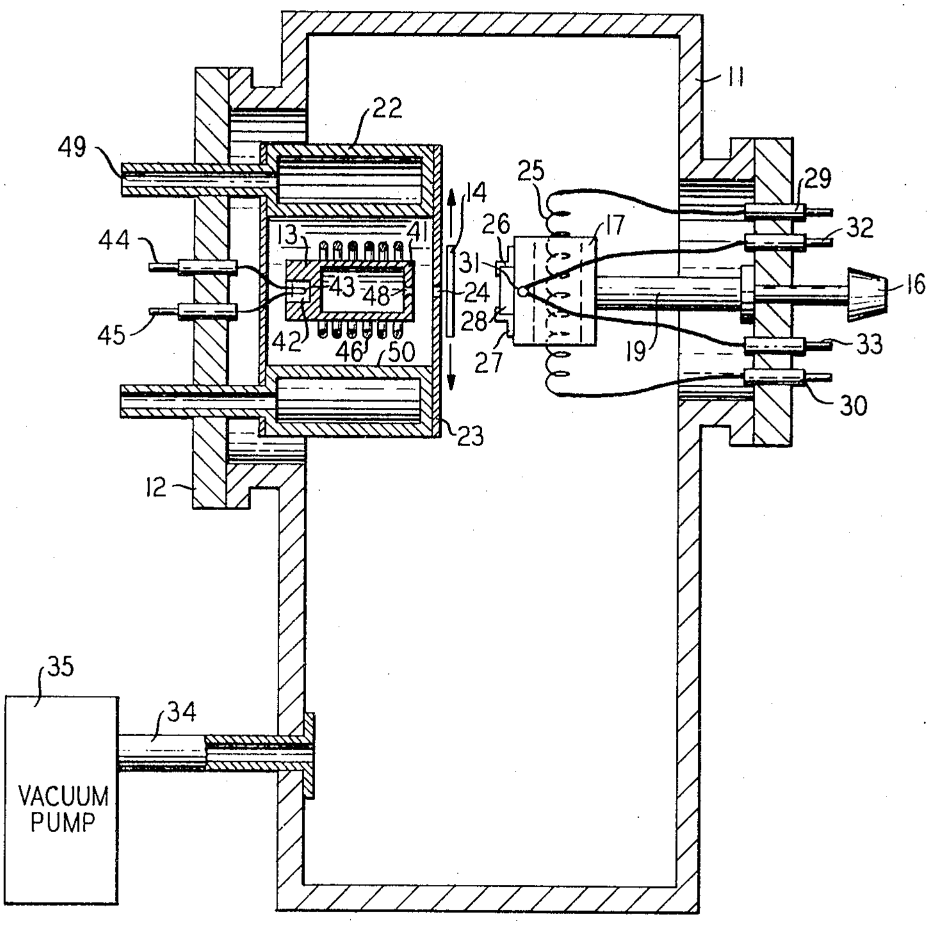
INVENTORS J. R. ARTHUR, JR.
F. J. MORRIS
BY Michael J. Urbano
ATTORNEY 3,666,553

John Read Arthur, Jr., Murray Hill, and Francis Joseph Morris, Plainfield, N.J., assignor to Bell Telephone Laboratories, Incorporated, Murray Hill, N.J.

Filed May 8, 1970, Ser. No. 35,748
Int. Cl. B44d *1/18*
U.S. Cl. 117—229 13 Claims

ABSTRACT OF THE DISCLOSURE

The growth of high sheet resistance thin films of Group III(*a*)-V(*a*) semiconductor compounds is effected in an ultra-high vacuum by directing beams of the constituent elements at an amorphous substrate preheated to temperatures ranging from 250° C.–450° C. The described process is a nonequilibrium growth technique which permits the growth of non-epitaxial films of controllable thickness.

BACKGROUND OF THE INVENTION

This invention relates to the growth of high resistivity thin films of Group III(*a*)–V(*a*) compound semiconductors.

In thin film microcircuitry and related arts, there has for sometime been a need for a stable, high resistance layer. For example, in the newly conceived vidicon camera tube, which utilizes a passive diode array as a part of the target structure, a thin film "resistive sea" covers the array in order to leak off charge produced by an electron beam which scans the target. More specifically, as disclosed in U.S. Pat. No. 3,419,746, the diode array may be formed by diffusing P-regions through an $SiO_2$ mask into an N-type substrate. The resistive sea covers the $SiO_2$ as well as the P-regions. Currently, antimony trisulfide is one material employed to form the resistive sea. This material, although it possesses the required high sheet resistance of at least $5\times10^{12}$ ohms/square (resistivity divided by thickness) presents some difficulty in the tube fabrication process; namely, the high vapor pressure of antimony trisulfide prevents the camera tube from being baked at the bake-out temperature of about 400° C., a procedure which would be advantageous to remove impurities and provide a good vacuum. Consequenty, workers in the art have recognized the need for a suitable substitute.

Polycrystalline GaAs and GaP appear to be highly desirable candidates for use as the resistive sea, since they have negligible vapor pressure at the bake-out temperature. However, prior art attempts to produce high resistivity GaAs and GaP thin films to meet the above sheet resistance criterion have generally met with little success. One such attempt was reported by T. Pankey and J. E. Davey in Journal of Applied Physics, 37, 1507 (1966) with respect to GaAs and in Journal of Applied Physics, 40, 212 (1969) with respect to GaP. In neither case, however, were the authors concerned with the specific problem of fabricating an appropriate resistive sea for a vidicon camera tube. Furthermore, they report resistivities of only about $10^4$ ohm-cm. and $10^6$ ohm-cm. for polycrystalline GaAs and GaP, respectively, when grown on amorphous substrates such as quartz, Pyrex, or glass and properly annealed. These resistivities correspond approximately for the thinnest films grown (about 1000 A.) to sheet resistances of only about $10^9$ ohm/square and $10^{11}$ ohm/square, respectively.

In the Pankey-Davey vapor deposition technique, GaP or GaAs films were deposited by evaporation of Ga atoms from a Ga source crucible at a temperature $T_1$ (about 935° C.) onto a substrate at temperature $T_2$ (about 150°–825° C.) surrounded by an ambient of $As_4$ or $P_4$, the pressure of which was determined by the temperature of the chamber, $T_3$ (about 150° C.). Deposition occurred with $T_1>T_2>T_3$. This technique is not desirable for several reasons. First, the reported resistivities were not as high as required in the resistive sea and other applications. Secondly, mass production of the films would be hampered since precise control of three temperatures is required and the effects of variations in these temperatures is not yet understood completely. Moreover, loss of $As_4$ (or $P_4$) into the pumping system is excessive and there is the distinct possibility of film contamination from poor vacuum conditions. Finally, films produced by this technique may have an undesirable island structure.

It is, therefore, one object of the present invention to fabricate high resistivity thin films.

It is another object to fabricate such thin films on an amorphous substrate.

It is still another object of this invention to fabricate such films having a low vapor pressure.

It is yet another object of this invention to fabricate a high resistivity thin film for use as the resistive sea in vidicon camera tubes in which the target is a semiconductor diode array.

SUMMARY OF THE INVENTION

The growth of high resistivity, polycrystalline thin films of Group III(*a*)–V(*a*) semiconductor compounds (e.g., GaAs, GaP) is effected in an ultra-high vacuum by directing molecular beams of the constituent elements at an amorphous substrate (e.g., $SiO_2$) preheated to temperatures ranging from 250°–450° C. The process is a nonequilibrium, physical vapor growth technique which permits growth of non-epitaxial films of controllable thickness with sheet resistances of at least $5\times10^{12}$ ohms/square. A similar procedure is described in copending application Ser. No. 787,470 (J. R. Arthur, Jr. Case 3) filed on Dec. 27, 1968, and assigned to applicants' assignee, which, however, is directed to the epitaxial growth of group III(*a*)–V(*a*) thin films.

The described technique is premised upon the fact that Group III(*a*)–V(*a*) elements contained in compound semiconductors are adsorbed upon the surface of amorphous semiconductor substrates at varying rates, the V(*a*) elements typically being almost entirely reflected therefrom in the absence of III(*a*) elements. However, it has been determined that growth of high resistivity, polycrystalline, stoichiometric III(*a*)–V(*a*) semiconductor compounds may be effected by providing vapors of Group III($a$) and V($a$) elements at the substrate surface, an excess of Group V($a$) element being present with respect to the III($a$) element, thereby assuring that the entirety of the III($a$) element will be consumed while the nonreacted V($a$) excess is reflected. Briefly, the technique involves placing an amorphous substrate surface in a vacuum chamber, evacuating the chamber and directing at least one molecular beam containing the constituent components of the desired material at the substrate for a time period sufficient to grow a polycrystalline film of the required thickness.

Utilizing this technique, polycrystalline GaAs and GaP thin films having sheet resistances of at least $5\times10^{12}$ ohms/square (about $10^7$ ohms-cm.) have been fabricated on $SiO_2$ substrates. Single crystal films grown from the same source material under identical vacuum conditions, but on a single crystal GaAs substrate at about 550° C., had resistivities of only about 0.1 ohm-cm. This enormous difference in resistivity between the polycrystal and single crystal thin films is due, we believe, to the presence of surface or interface electronic states which are present in much greater numbers in the polycrystalline films and which act to trap carriers ionized from bulk impurity states.

BRIEF DESCRIPTION OF THE DRAWING

These and other objects of the invention, together with its various features and advantages, can be easily understood from the following more detailed description taken in conjunction with the accompanying drawing in which the sole figure is a partial schematic-partial cross-sectional view of apparatus for practicing the present invention.

DETAILED DESCRIPTION

Turning now to the figure, there is shown apparatus in accordance with the invention for growing non-epitaxial, polycrystalline thin films of Group III($a$)–V($a$) semiconductor compounds of controllable thickness on an amorphous substrate by molecular beam deposition.

The apparatus comprises a vacuum chamber 11 having disposed therein a gun port 12 containing a cylindrical gun 13, typically a Knudsen cell, and a substrate holder 17, typically a molybdenum block, connected by means of shaft 19 to a control knob 16 exterior to chamber 11 capable of effecting rotary motion of holder 17. Optionally, a plurality of guns may be contained within the gun port in cases where it is desired to heat different source materials separately. Also shown disposed within chamber 11 is a cylindrical liquid nitrogen cooling shroud 22 which surrounds gun 13 and a collimating frame 23 having a collimating aperture 24. A movable shutter 14 is disposed in front of aperture 24. Substrate holder 17 is provided with an internal heater 25 and with clips 26 and 27 for affixing a substrate member 28 thereto. Additionally, a thermocouple is disposed in aperture 31 in the side of holder 17 and is coupled externally via connectors 32–33 in order to sense the temperature of substrate 28. Chamber 11 also includes an outlet 34 for evacuating the chamber by means of a pump 35.

A typical cylindrical gun 13 comprises a refractory crucible 41 having a thermocouple well 42 and a thermocouple 43 inserted therein for the purpose of determining the temperature of the material contained therein. Thermocouple 43 is connected to an external detector (not shown) via connectors 44–45. Additionally, the crucible 41 has a source chamber 46 in which source material (e.g., bulk GaP) is inserted for evaportion by heating coil 47 which surrounds the crucible. The end of crucible 41 adjacent aperture 24 is provided with a knife-edge opening 48 of diameter preferably less than the average mean free path of atoms in the source chamber.

For purposes of exposition, the present invention will be described in detail by reference to an illustrative example wherein the various operating parameters are given.

The first step involves selecting a suitable amorphous substrate which may readily be obtained from commercial sources or fabricated by well-known techniques such as oxidizing a silicon substrate.

Next, the substrate is placed in an apparatus of the type shown in the figure, and thereafter, the background pressure in the vacuum chamber is reduced to less than $10^{-6}$ torr and preferably to a value of the order of $10^{-9}$ to $10^{-10}$ torr, thereby precluding the introduction of any deleterious components onto the substrate surface. The next steps in the process advantageously involve introducing liquid nitrogen into the cooling shroud via entrance port 49 and heating the substrate member to the growth temperature which ranges from 250°–450° C. dependent upon the specific material to be grown, such range being dictated by considerations relating to arrival rates and surface diffusion. What few impurities might be present on the substrate surface are removed by this heating, thereby producing an atomically clean growth surface.

Following, the gun 13 employed in the system, which has previously been filled with the requisite amounts of the constituent of the desired film to be grown, is heated to a temperature ranging from 900° C.–1100° C. sufficient to vaporize the contents thereof to yield (with shutter 14 open) a molecular beam; that is, a stream of atoms manifesting velocity components in the same direction, in this case toward the substrate surface. The atoms of molecules reflected from the surface strike the interior surface 50 of the cooled shroud 22 and are condensed, thereby insuring that only atoms or molecules from the molecular beam impinge upon the surface.

For the purposes of the present invention, the amount of source materials (e.g., GaP or GaAs) furnished to the gun 13 must be sufficient to provide an excess of the V($a$) element (e.g., $P_2$ or $As_2$) with respect to the III($a$) element (e.g., Ga). This condition arises not only from the fact that an excess of III($a$) element produces a low resistivity, metallic film, but also from the large differences in sticking (i.e., condensation) coefficient of the several materials; for example, unity for Ga and less than $10^{-2}$ for $P_2$ on an amorphous surface, the latter increasing to unity when there is an excess of Ga on the surface. Therefore, as long as the $P_2$ arrival rate is higher than that of Ga, the growth will be stoichiometric. Similar considerations apply to other III($a$)–V($a$) compounds such as GaAs.

Growth of the desired polycrystalline film is effected by directing the molecular beam generated by gun 13 at the collimator 23 which functions to remove velocity components therein in directions other than those desired, thereby permitting the desired beam to pass through the collimtaing aperture 24 to effect reaction at the substrate surface. It should be noted, however, that collimation of the beam by means of collimating aperture 24 is not essential. Films have been successfully grown without the aperture. In such cases the source temperature is high enough (900°–1100° C.) to insure that the direct flux is much greater than the reflected flux and the vacuum pump speed is high enough to insure the rapid removal of the reflected flux. Growth is continued for a time period sufficient to yield a non-epitaxial film of the desired thickness, a feature of the subject technique residing in the controlled growth of films of thickness ranging from a single monolayer (about 3 A.) to more than about 800 A. with sheet resistances of at least $5\times10^{12}$ ohms/square ($10^7$ ohm-cm.). Thicker films with similar resistivities and the required sheet resistance may be fabricated by subsequently annealing the film in a gaseous atmosphere such as nitrogen. Such thicker films may be of special interest in the aforesaid vidicon camera tube to absorb any X-rays which may be generated by the scanning electron beam.

The reason which dictates the use of the aforementioned temperature ranges can be understood as follows.

As mentioned previously, Group III($a$)–V($a$) elements contained in compound semiconductors are adsorbed upon the surface of amorphous substrates at varying rates, the V($a$) elements being almost entirely reflected therefrom in the absence of III($a$) elements. However, the growth of stoichiometric III($a$)–V($a$) semiconductor compounds may be effected by providing vapors of Group III($a$) and V($a$) elements at the substrate surface, an excess of Group V($a$) element being present with respect to the III($a$) element, thereby assuring that the entirety of the III($a$) element will be consumed while the nonreacted V($a$) excess is reflected. In this connection, the aforementioned substrate temperature range is related to the arrival rate and surface mobility of atoms striking the surface, i.e., the surface temperature must be high enough ($>250°$ C.) to prevent the V($a$) element from accumulating on the surface with the III($a$)–V($a$) compound being formed. When such accumulation occurs, the thin film tends to be nonreproducible with erratic resistivity. On the other hand, for substrate temperatures exceeding about 450° C. the film growth occurs with reltaively large crystal grain sizes and correspondingly lower resistivity. Similarly, the cell temperature should be high enough ($\geq 900°$ C.) to produce appreciable evaporation, as well as an excess of the V($a$) element in the beam, and yet not so high ($\leq 1100°$ C.) that the higher vaporization rate of the V($a$) element will result in most of the V($a$) element being reflected from the surface before being trapped there by the III($a$) element.

The following examples of the present invention are given by way of illustration and are not to be construed as limitations, many variations being possible within the spirit and scope of the invention.

Example I

This example describes a process for the growth of nonepitaxial thin film of polycrystalline gallium arsenide upon a silicon dioxide substrate member.

A silicon substrate member was oxidized by conventional techniques to form an $SiO_2$ surface inserted in an apparatus of the type shown in the figure at a distance of about 3 cm. from the Knudsen cell. In the apparatus actually employed, a single graphite Knudsen cell was ocntained in the gun port, one gram of gallium arsenide polycrystals being placed in the source chamber of the cell. Following, the vacuum chamber was evacuated to a background pressure of the order of $10^{-9}$ torr and the substrate, with its silicon dioxide surface (about 1 cm. x 1 cm.) facing the gun, was preheated to a temperature of approximately 425° C. for about 10 minutes prior to deposition. At this temperature the $SiO_2$ surface is cleaned sufficiently to proceed with deposition. Accurate measurement of the substrate temperature, which is important to molecular beam growth, was accomplished by imbedding a Chrome-Alumel thermocouple in a hole 10 mil in diameter in the molybdenum heating block. A tungsten-5% versus tungsten-26% rhenium thermocouple was used for measurement of the Knudsel cell temperature. The thermocouple reading for the cell was calibrated with a pyrometer looking directly into the effusion orifice. At this time, liquid nitrogen was introduced into the cooling shroud and the Knudsen cell heated to a temperature of 900° C., thereby resulting in vaporization of the gallium arsenide polycrystals contianed therein and the consequent flow of molecular beams toward the collimtaing frame which removed velocity components in the beams which were undesirable. At these temperatures, the molecular beam consisted of three species: Ga, $As_2$ and $As_4$. With the shutter open, the beams were focused upon the substrate surface for a period of about 5 minutes, so resulting in the growth of a non-epitaxial, polycrystalline, stoichiometric film 120 A. in thickness of gallium arsenide upon the substrate. The sheet resistance of the film was measured to be about $5 \times 10^{12}$ ohms/square. Other GaAs films less than 250 A. thick, grown without the collimating frame and cooling shroud, and at pressures of about $10^{-6}$ torr, exhibited sheet resistances exceeding $10^{13}$ ohms/square. It should be noted, however, that the higher sheet resistances achieved in the latter apparatus are also readily attainable in the former. The lateral dimensions of the film may be controlled by well-known masking techniques or merely by appropriate choice of the substrate size.

Example II

The procedure of Example I was repeated at the same temperatures in a similar apparatus which, however, had no collimating frame, no cooling shroud, and operated at pressures of about $10^{-6}$ torr. In this case, the source chamber contained one gram of GaP polycrystals also obtained from commercial sources. Again, the molecular beam consisted of three species: Ga, $P_2$ and $P_4$. With the substrate positioned about 3–5 cm. away from the Knudsen cell, a film of about 200 A. thickness and $3 \times 10^{14}$ ohms/square sheet resistance was produced with the shutter open for about 5 minutes. The GaP films were also stoichiometric. As before, GaP films of the required sheet resistance can readily be grown utilizing the entire apparatus as shown in the figure.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the aforementioned temperature ranges for source and substrate apply equally as well to other III($a$)–V($a$) compounds besides GaAs and GaP.

What is claimed is:

1. A method for the growth of a high sheet resistance polycrystalline thin film of a Group III($a$)–V($a$) semiconductor compound upon an amorphous substrate surface which comprises the steps of reducing the background pressure to a subatmospheric pressure, preheating said substrate to a temperature within the range of 250°–450° C., directing at least one molecular beam comprising the constituent components of the desired film upon said preheated substrate for a time period sufficient to effect growth of a film of the desired thickness, and maintaining said beams so that at said substrate surface there is an excess of said Group V($a$) element with respect to said Group III($a$) element.

2. The method of claim 1 wherein said substrate surface comprises silicon dioxide.

3. The method of claim 2 wherein said background pressure is less than $1 \times 10^{-9}$ torr.

4. The method of claim 2 wherein said compound is selected from the group consisting of gallium arsenide and gallium phosphide.

5. The method of claim 4 wherein said time period is sufficient to produce film having a sheet resistance of at least $5 \times 10^{12}$ ohm/square.

6. The method of claim 1 including the additional step of annealing said thin film in a gaseous atmosphere.

7. The method in accordance with claim 1 wherein said molecular beam is collimated and is formed by heating at least one gun member containing the constituent components of the desired film to a temperature sufficient to vaporize said components and permitting the resultant vapor to impinge upon a collimating frame.

8. The method of claim 7 wherein said gun member is heated to a temperature in the range of 900°–1100° C.

9. The method in accordance with claim 7 wherein said gun member contains gallium arsenide.

10. The method in accordance with claim 7 wherein said gun member contains gallium phosphide.

11. A thin film of a polycrystalline semiconductor Group III($a$)–V($a$) compound having a sheet resistance in excess of at least $5 \times 10^{12}$ ohms/square in combination with an amorphous substrate upon which said thin film is grown by molecular beam deposition of the constituent elements of said compound.

12. The thin film of claim 11 wherein said substrate comprises $SiO_2$.

13. The thin film of claim 11 wherein said compound is selected from the group consisting of GaAs and GaP.

References Cited

UNITED STATES PATENTS

| | | | |
|---|---|---|---|
| 3,476,593 | 11/1969 | Lehrer | 117—106 A X |
| 3,480,472 | 11/1969 | Dersin et al. | 117—106 A X |

OTHER REFERENCES

Arthur et al.: Journal of Vacuum Science and Technology, vol. 6 pp. 545–548, July 1969.

Shaw, D. W.: Journal of the Electrochemical Society, pp. 905–908, September 1966.

RALPH S. KENDALL, Primary Examiner

C. WESTON, Assistant Examiner

U.S. Cl. X.R.

117—119, 201; 148—185, 187